US006923235B2

(12) United States Patent
Petitjean

(10) Patent No.: US 6,923,235 B2
(45) Date of Patent: Aug. 2, 2005

(54) DEVICE FOR DISPLACING AN ADHESIVE TAPE

(75) Inventor: Cyriaque Petitjean, Charantonnay (FR)

(73) Assignee: CEFMA, Genas (FR)

( * ) Notice: Subject to any disclaimer, the term of this patent is extended or adjusted under 35 U.S.C. 154(b) by 115 days.

(21) Appl. No.: 10/117,075

(22) Filed: Apr. 8, 2002

(65) Prior Publication Data

US 2002/0158163 A1 Oct. 31, 2002

(30) Foreign Application Priority Data

Apr. 20, 2001 (FR) ........................................ 01 05833

(51) Int. Cl.[7] ........................................ B32B 31/18

(52) U.S. Cl. ..................... 156/353; 156/361; 156/368; 156/521; 156/566

(58) Field of Search ............................ 156/353, 354, 156/355, 361, 362, 366, 367, 368, 566, 521, 543, 517; 226/93, 94, 95, 96

(56) References Cited

U.S. PATENT DOCUMENTS 4,985,096 A * 1/1991 Bekker-Madsen ............ 156/64
5,674,345 A * 10/1997 Nash .......................... 156/264

FOREIGN PATENT DOCUMENTS

DE 1116145 B 10/1961
EP 0 577 241 A2 1/1994
EP 0 921 073 A1 6/1999

* cited by examiner

*Primary Examiner*—Chris Fiorilla
*Assistant Examiner*—George Koch
(74) *Attorney, Agent, or Firm*—Oliff & Berridge, PLC

(57) ABSTRACT

This device comprises a support for a spool (9) of adhesive tape (10) and two spaced drive means (A and B), of the belt or chain type, describing an endless trajectory whilst passing over a drive wheel (14 or 15) and at least one idler wheel (16 or 17), this trajectory being such that during it the adhesive face (10*a*) of the tape (10) is pressed against the portions (12*a* or 13*a*) of these means, and a common electric motor (20) imparts the same motion to the two portions (12*a*, 13*a*).

According to the invention, these two drive means (A and B) are disposed in such a way that the active portion (12*a*, 13*a*) has an edge (12*b*, 13*b*) disposed substantially in the same plane as that of the juxtaposed portion, this plane being parallel and merged with that of the tape, these two active portions (12*a*, 13*a*) being spaced from each other by a distance less than the width of the adhesive tape (10) such that their edges (12*b*, 13*b*) cooperate with the longitudinal borders of said tape.

6 Claims, 2 Drawing Sheets

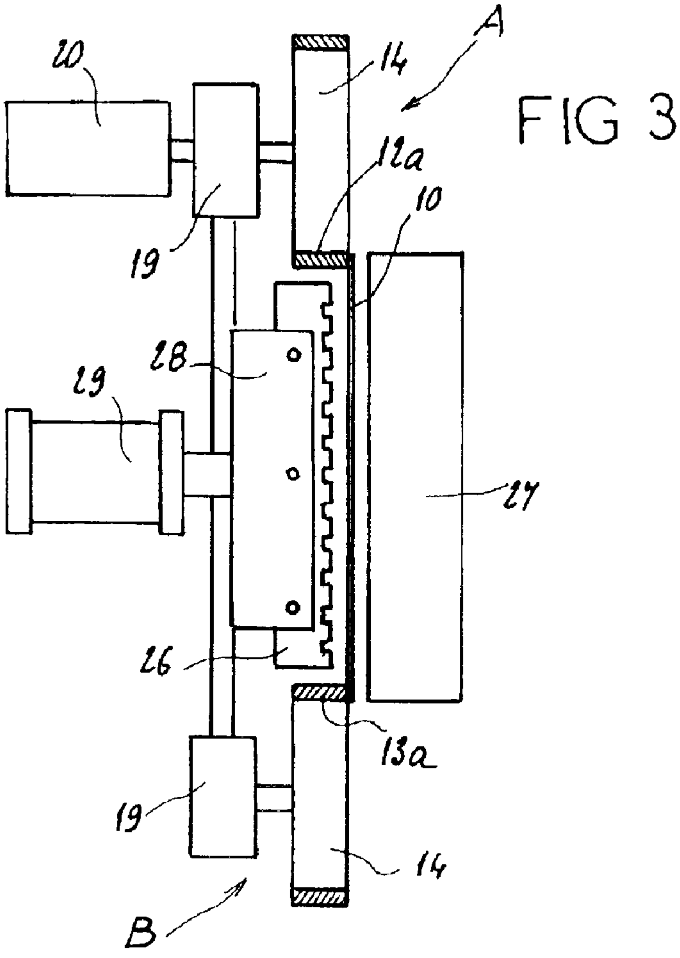
FIG 3
FIG 4
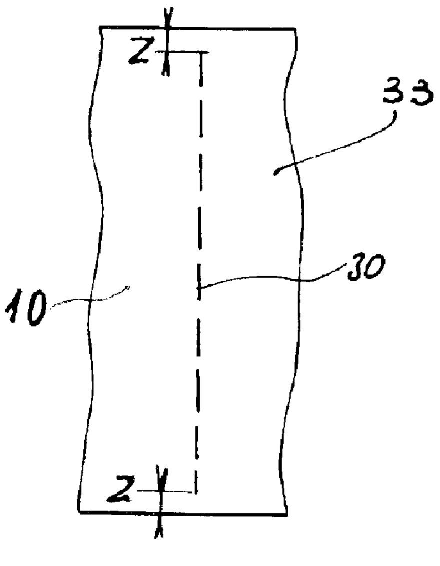

DEVICE FOR DISPLACING AN ADHESIVE TAPE

The invention relates to a device for displacing an adhesive tape, for example for an apparatus for dispensing adhesive strips on packages.

In the present description, the expression "strip of adhesive tape" refers to an adhesive label, an adhesive tape binding together several components of a batch or an information tape extending over the side or over the top of a batch or of an item.

Before dispensing a strip of adhesive tape, it is first necessary to unwind a spool of adhesive tape and to route it to a cutting or partial cutting station. In general, because of the adhesive nature of one of the faces of the tape, the routing is provided by contact of rollers against the non-adhesive back of the tensioned tape. Whatever means are used for unwinding the spool and for displacing the tape, dispensing problems frequency occur because of the adhesive nature of the tape or of the strips.

The document EP-A-921 073 in the name of the applicant relates to a device comprising means of unwinding a spool of adhesive tape, means of producing a transverse partial cut in the tape, a roller or a brush for pressing the tape onto one of the longitudinal faces of each moving package, and means causing the fracture of the partially cut line by an instantaneous difference in speed between that of the tape and that of the strip of tape respectively.

More precisely, in this device, the fracture of the partially cut line is ensured by the acceleration of the batch upon which the adhesive tape is applied with respect to the upstream conveyor carrying a stream of packaging to the dispensing station, this acceleration being obtained by the downstream drive means which drive the batch of packages at a linear speed higher than that of the displacement of the upstream conveyor. In practice, it proves that the speed difference between the upstream and downstream conveyors necessitates fine and regular adjustments, in default of which the fracture of the strip does not take place in perfect condition.

The purpose of the present invention is to provide a device for displacing an adhesive tape, usable among other applications for the dispensing of strips of tape on moving packages or items, which overcomes the disadvantages of current devices and, in particular, eliminates the stoppages in dispensing resulting from blockages caused by the jamming of the tape or of the strips.

From the document EP-A-557 241 there is known a device for displacing strips of labels cut in an adhesive tape in a spool, the device comprising belts of circular cross section, superimposed and each describing an endless trajectory and disposed in a casing connected to a vacuum and their portions describing a straight trajectory in the opening of the casing, and receiving the labels of their outer faces, these labels being applied to the portions by their adhesive faces but held by the suction of the casing. At the end of the run, each label is separated from the portions by peeling rollers which, despite their small area of contact with each label, are the sources of problems, due to the sticking and accumulation on them of labels.

The document DAS 1 116 145 relates to a device for dispensing pre-pasted staniole in the trajectory of the moving bottleneck. After pasting and cutting out, the staniole is transferred onto two spaced belts connected to the same driving means, and more precisely is pressed, along its longitudinal edges, against the outside face of the spaced vertical portions of the two belts describing endless trajectories on either side of the trajectory along which the necks pass.

Like in the preceding device, the edges of the two belts are in different planes, parallel with each other, but perpendicular to the tape.

The belts move in steps in such a way as to bring the first staniole into the trajectory of a neck which picks it off in passage, before brushes fold down the sides of this staniole against the neck of the bottle. Despite the picking-off by the neck which passes between the two belts, this device is not free of dispensing problems.

The present invention makes use of these drive means by organizing them in a different way.

For this purpose, in the device for displacing an adhesive tape according to the invention, the two drive means are disposed in such a way that the active portion that, in each of them, cooperates with the adhesive face of the tape, is straight, parallel, spaced from the juxtaposed active portion of the other drive means and has an edge disposed substantially in the same plane as that of the active portion of the juxtaposed drive means, this plane being parallel and merged with that of the tape, these two facing active portions being spaced from each other by a distance less than the width of the adhesive tape such that their edges cooperate with the longitudinal borders of said tape.

With this device, the adhesive tape is displaced solely by its temporary sticking to the portions of the two drive means. Because of this, the adhesive face is protected during its displacement and there is no risk of it sticking to a surface of the device and thereby generating dispensing problems. The arrangement of the drive means with the belts substantially in the same plane and on either side of the tape in motion allows the portions to separate from the adhesive face by generating two opposing forces which, being perpendicular to the longitudinal borders of the tape, cancel each other out and have no effect on the output trajectory of the tape.

In one embodiment and for the dispensing of partially cut adhesive strips, the endless drive means are disposed in such a way that the displacement trajectory of the tape brings the free end of an end strip into the trajectory of packages moving on a conveyor, upstream of a pressing roller or brush, and the electric motor, common to the drive means, is controlled by a control means triggering its powering when each package passes and stopping its powering when a length of strip is unwound and is at least partially pressed against the package, in order to cause, by stopping the unwinding, tearing along a partially cut line formed between the tape and its end strip.

In the waiting position, the free end of the partially cut end strip is protruding from the drive means and is disposed in the displacement trajectory of the package that has to receive that strip and upstream of the pressing brush or roller. In these conditions, when the moving package encounters the end of the strip, the adhesive face of the latter sticks to the package whilst, simultaneously, the drive means of the dispensing device are powered in order to feed a length of tape corresponding to the length of a strip. As soon as this length of tape is fed, the drive means are stopped in order that the displacement force, imparted by the package to the strip of tape stuck onto it, causes the fracture of the partially cut line between the strip and the adhesive tape. By the movement of the conveyor, the strip is pressed by the brush or by the roller onto the corresponding face of the package, whilst the end of the next strip protrudes into the displacement trajectory of the packages. This device operates step by step, whatever the gap between two successive packages may be.

Advantageously, the means of partially cutting the strip in the tape comprise, on the one hand, a blade disposed transversely between the two active portions of the unwinding means, this blade being connected to means capable of moving it alternately in one direction toward the tape and then in the other direction, under the control of control means reacting to the stoppage of the unwinding and, on the other hand, a fixed anvil against which the non-adhesive back of the tape slides.

This simple arrangement makes it possible to produce the partial cut whilst the motion is stopped and in excellent conditions, without increasing the overall dimensions of the device.

Other features and advantages will emerge from the following description given with reference to the appended diagrammatic drawing showing, by way of example, an embodiment of the device according to the invention in the case of its application to an installation for dispensing partially cut strips.

FIG. 3 is a side view in cross section along III—III of FIG. 2 showing, on an enlarged scale, an embodiment of the means of producing the partial cut.

FIG. 4 is a partial front view in elevation of the tape showing, on an enlarged scale, the partial cut produced in the tape by the means shown in FIG. 3.

Figure 1:
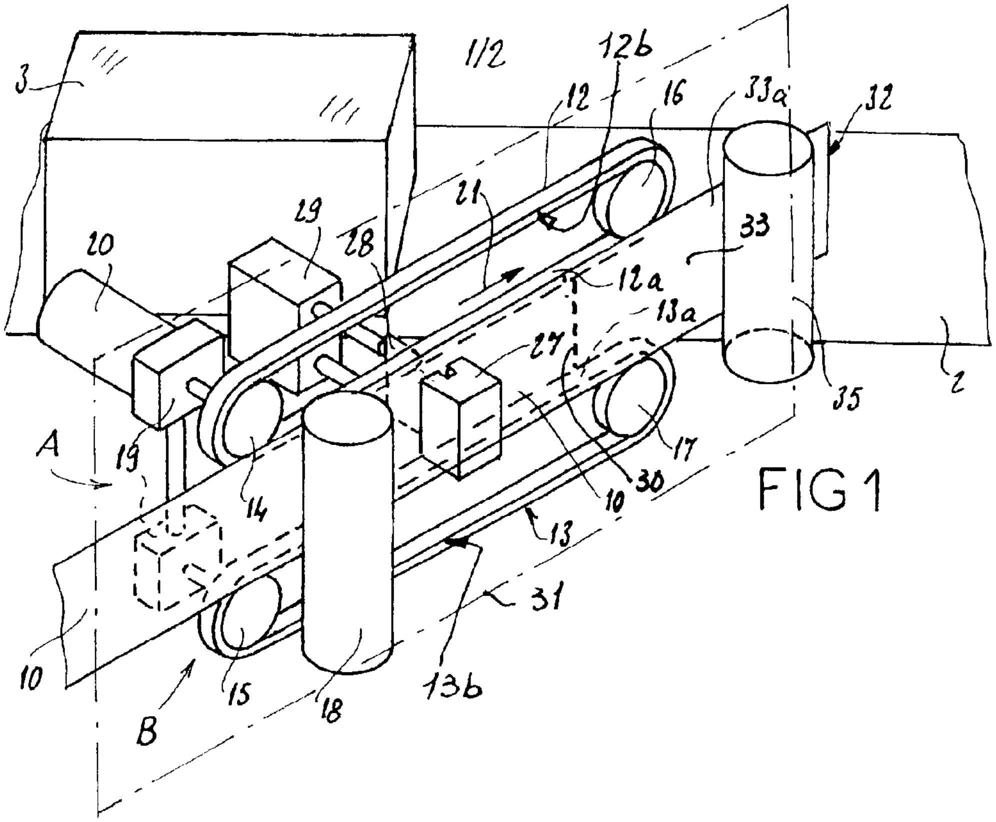
FIG. 1 is a perspective view of one embodiment of the device according to the invention, when it is in the waiting position.
Figure 2:
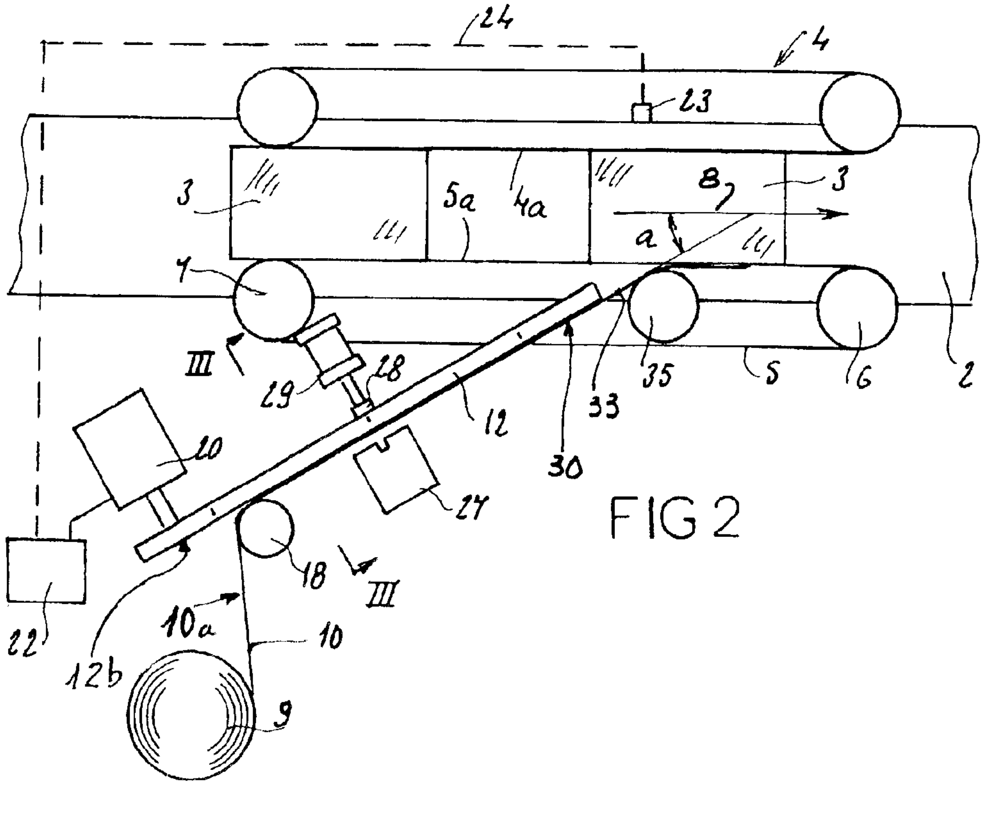
FIG. 2 is a plan view from above of an installation equipped with this device, during the unwinding of a strip of tape.

In FIGS. 1 and 2, the numerical reference 2 denotes the plane of displacement of a roller conveyor upon which the packages 3 are displaced by drive means and, for example, by the spaced portions 4*a*, 5*a* of drive belts 4 and 5 circulating between a drive pulley 6 and an idler pulley 7 and moving in the direction of the arrow 8 shown in FIG. 2. 9 denotes a spool of adhesive tape 10 whose face 10*a* bears the adhesive.

In the embodiment shown, the means of displacement of the adhesive tape ensure the unwinding of the spool 9 and comprise two spaced drive means A, B each composed of a belt 12, 13 circulating between a drive wheel 14, 15 and an idler wheel 16, 17, whilst describing trajectories in the vertical plane, parallel with the tape that has to be displaced. The two portions 12*a*, 13*a*, that face one another, are straight, parallel and spaced by a distance less than the width of the tape 10, and are disposed such that each one's edge 12*b*, 13*b*, facing the tape, is in the same plane as that of the other belt, this plane being parallel with the tape, in order that, by pressing by means of a roller 18 of vertical axis, the longitudinal adhesive borders of the tape 10 temporarily stick against these longitudinal edges 12*b*, 13*b*.

The drive wheels 14 and 15 are connected by a gear mechanism 19 to a common electric motor 20 which is capable of imparting, to the belts 12 and 13, a movement of displacement in the direction of the arrows 21 and at a speed equal to the speed of displacement of the packages 3. This motor, of the stepper or brushless type, is controlled by a control unit 22 that reacts to the signals from a sensor 23, visible in FIG. 2, detecting the passage of each package 3 and to which it is connected by a circuit 24.

The device comprises means producing a partial cut in the unwound tape 10 and which, in the embodiment represented and as shown in more detail in FIG. 3, comprise a toothed blade 26 and an anvil 27, disposed on either side of the displacement trajectory of the tape 10. The blade 26 is disposed between the two portions 12*a*, 13*a* of the drive means A, B and is carried by a support 28 which is itself connected to means 29 capable of displacing the blade alternately between a position of rest, as shown in FIG. 3, and a working position in which it comes into contact with the tape 10, and therefore bearing against the anvil 27. In this position, the blade produces a transverse partially cut line 30 extending over the major portion of the width of the adhesive tape 10, with the exception of the end zones Z, shown in FIG. 4, corresponding to the longitudinal borders of the tape adhering to the edges 12*b*, 13*b* of the belts 12 and 13. The driving means 29 can consist of a pneumatic actuator, an electric actuator or an electromagnet. The assembly, consisting of the blade 26 with its support 28 and its driving means 29 and also the anvil 27, is carried by a support, which is not shown, able to be displaced longitudinally with respect to the chassis carrying the whole of the dispensing device in such a way as to be able to adjust the position of the partially cut line 30 with respect to the free end 32 of the partially cut strip 33.

The blade 26 can also have a straight cutting edge producing a clean cut but constituting a partial cut because of the uncut zones Z.

FIGS. 1 and 2 show that the chassis 31, carrying the two drive means A and B, the roller 18 and the partial cutting means 26 to 29, is disposed laterally with respect to the displacement trajectory of the packages 3 represented by the arrow 8 in FIG. 2 and forming, with respect to this trajectory, an angle a which, in the embodiment shown, is acute but which can also be a right angle if the environment so permits.

The control unit 22, governing the powering of the electric stepper motor 20, is designed to stop the powering of this motor when the free end 32 of the strip 33 protruding from the downstream ends of the drive means A and B come into the displacement trajectory of the packages 3, that is to say when it occupies the position shown in FIG. 1.

In these conditions, when a package being moved by the conveying means 4, 5 encounters the free end 32 of the strip 33, the adhesive face of this strip sticks onto the end of the package and, in this case, against its longitudinal lateral face, and it does so all the more easily if said free end 32 is disposed just upstream of a roller or a brush 35 for pressing the strip against the face of the package. Simultaneously, the sensor 23 detects the passage of the package and causes the powering of the motor 20 and the putting into motion of the belts 12 and 13 over a length corresponding to the length of the strip. The strip, still linked with the tape 10, is therefore applied by the roller 35 against the face of the package.

As soon as the motor 20 stops, the drive force imparted to the package 3 and to the strip 32 causes the tearing of the partially cut line 30, such that the dispensed strip leaves with the package whilst the end 32 of the next strip is disposed in the waiting position, protruding into the trajectory of the next package. The stopping of the tape triggers the functioning of the means producing the partial cut 30.

From the above description, it can be seen that the device operates automatically on the passage of each package, irrespective of the gap between two packages.

In comparison with current dispensing devices, it operates reliably since the movement of the portions 12*a* and 13*a*, at the end of straight runs, takes place by an outward separation, starting from the longitudinal borders of the strip, and in the reverse direction, without imparting to the strip 33 any force whatsoever tending to deviate it from the trajectory imposed upon it. Furthermore, the portions protect the adhesive face and prevent it, when it is stopped or during its displacement, from sticking onto a surface of the device thereby generating a dispensing problem.

The length of the portions 12*a*, 13*a* of the two belts 12 and 13 is determined such that, by adjusting the position of the means of producing the partial cut 30, the same dispensing device can be used for dispensing strips of different lengths.

In a variant embodiment, the belts 12 and 13 are replaced by endless chains against the lateral faces of which the adhesive tape is pressed.

Although it is essential that the portions 12*a*, 13*a* describe straight parallel trajectories, the return portions can, depending on the available volume, describe various trajectories by passing over more than one idler pulley 16 or 17.

The whole of the device, which has been described in the case of its application to the dispensing of strips of adhesive tape on the side of a package, can also place adhesive strips on the top of a package or of a batch of packages, by modifying its position with respect to the trajectory of these packages.

In a variant that is not shown, the means of producing the partial cut 30 are disposed outside of the drive means A and B, upstream or downstream of these means.

This device for displacing adhesive tape can also be used with means for cutting the strip downstream of the drive means A and B. In this case, the device is similar to the one shown in FIGS. 1 and 2 with the exception of the cutting-off means which can be of the same type as those shown in FIG. 3, with a straight blade with a length at least equal to the width of the tape and displaced whilst the tape is stopped or can be rotary and operate before the stopping of the motion of the tape.

Even though the device for displacing an adhesive tape has been described in its application of a device for dispensing adhesive strips, its application is not limited to this since it can be used for dispensing an adhesive tape between two stations carrying out various operations on the tape, such as the placing of labels, printing and decoration.

Similarly, the device has been described in the case of an application functioning with an adhesive tape moving in steps with intermediate stops, but it can also be applied to an installation operating continuously and continuously dispensing the adhesive tape or strips of tape cut off whilst in motion, for example by means of a rotary cutter.

What is claimed is:

1. A device for displacing an adhesive tape comprising:

a support for a spool of the tape; and a pressing means for pressing the tape; and a first drive means and a second drive means for displacing the tape, the first and second drive means being driven by common driving means;

wherein:

each of the first drive means and the second drive means defines a continuous trajectory passing over a respective drive wheel and at least one respective idler wheel, a contact portion of the first drive means and an contact portion of the second drive means each contacting the respective drive wheel and the at least one respective idler wheel;

the pressing means having a central rotational axis perpendicular to a central rotational axis of each of the respective drive wheel and the at least one respective idler wheel, the central rotational axis of each of the respective drive wheel and the at least one respective idler wheel are parallel;

an adhesive face of the tape is pressed against an edge portion of the first drive means and an edge portion of the second drive means;

the edge portion of the first drive means and the edge portion of the second drive means are parallel to each other and spaced apart from each other;

the edge portion of the first drive means and the edge portion of the second drive means are substantially disposed in a plane parallel to the central rotational axis of the pressing means and perpendicular to the central rotational axis of each of the respective drive wheel and the at least one respective idler wheel, the adhesive face of the tape also being substantially disposed in the plane;

the edge portion of the first drive means and the edge portion of the second drive means are spaced from each other by a distance less than a width of the adhesive tape; and the edge portion of the first drive means and the edge portion of the second drive means are in contact with longitudinal borders of the tape, so that movement of the first and second drive means causes movement of the tape.

2. The device for displacing an adhesive tape of claim 1, wherein:

the first drive means and second drive means unwind the tape so as to convey an end of the tape toward a conveyor on which one or more packages are conveyed;

the first and second drive means convey the end of the tape so that the adhesive face of the tape is brought into contact with the one or more packages;

the adhesive face of the tape contacts the one or more packages at a location on the conveyor upstream of a pressing device;

the driving means is controlled by control means that cause the driving means to cause the first and second drive means to convey the tape to contact the one or more packages and cause the first and second drive means to stop conveying the tape when a length of the tape is unwound and adhered to the one or more packages;

stopping the first and second drive means while the conveyor continues to move causes the tape to be severed along a partially cut line on the tape.

3. The device for displacing an adhesive tape of claim 2, further comprising a cutting device, the cuffing device including:

a blade disposed transversely between the first and second drive means, the blade being connected to means capable of moving the blade toward and then away from the adhesive face of the tape when the first and second drive means to stop conveying the tape; and a fixed anvil in contact with a surface of the tape opposite to the adhesive surface, the anvil opposing the blade when the blade moves toward the adhesive surface of the tape.

4. The device for displacing an adhesive tape of claim 3, wherein the blade of the cutting device is disposed upstream of the first and second drive means in a direction that the tape is conveyed.

5. The device for displacing an adhesive tape of claim 3, wherein the blade of the cutting device is disposed downstream of the first and second drive means in a direction that the tape is conveyed.

6. The device for displacing an adhesive tape of claim 2, wherein the partially cut line on the tape is formed by a cutting device situated downstream of the first and second drive means in a direction that the tape is conveyed.

* * * * *